US012613415B1

(12) United States Patent
Koshelev et al.

(10) Patent No.: US 12,613,415 B1
(45) Date of Patent: Apr. 28, 2026

(54) OPTICAL SYSTEMS WITH PARTIAL REFLECTORS ON WAVEGUIDES FOR MAXIMIZING PUPIL SIZE COUPLING

(71) Applicant: Apple Inc., Cupertino, CA (US)

(72) Inventors: Alexander Koshelev, Louisville, CO (US); Jeffrey T Daiker, Lafayette, CO (US); Daniel Ott, Boulder, CO (US); Byron R Cocilovo, Boulder, CO (US)

(73) Assignee: Apple Inc., Cupertino, CA (US)

( * ) Notice: Subject to any disclaimer, the term of this patent is extended or adjusted under 35 U.S.C. 154(b) by 313 days.

(21) Appl. No.: 18/358,835

(22) Filed: Jul. 25, 2023

Related U.S. Application Data

(60) Provisional application No. 63/394,803, filed on Aug. 3, 2022.

(51) Int. Cl.
| | |
|---|---|
| *G02B 27/01* | (2006.01) |
| *F21V 8/00* | (2006.01) |
| *G02B 27/00* | (2006.01) |
| *G02B 27/14* | (2006.01) |
| *G02B 27/18* | (2006.01) |

(52) U.S. Cl.
CPC ....... *G02B 27/0172* (2013.01); *G02B 6/0016* (2013.01); *G02B 6/0018* (2013.01); *G02B 6/0031* (2013.01); *G02B 6/0055* (2013.01); *G02B 27/0081* (2013.01); *G02B 27/18* (2013.01); *G02B 2027/0125* (2013.01); *G02B 2027/0178* (2013.01); *G02B 27/14* (2013.01)

(58) Field of Classification Search
CPC ............ G02B 27/0172; G02B 27/0081; G02B 2027/0125; G02B 2027/0178; G02B 27/14; G02B 6/0055
See application file for complete search history.

(56) References Cited

U.S. PATENT DOCUMENTS

| | | | |
|---|---|---|---|
| 10,317,679 B2 | 6/2019 | Ayres et al. | |
| 11,187,902 B2 | 11/2021 | Urness et al. | |
| 12,306,427 B2 * | 5/2025 | Ukai | ...................... H04N 9/315 |
| 12,405,473 B2 * | 9/2025 | Bhakta | ................... G02B 6/003 |
| 2016/0041387 A1 * | 2/2016 | Valera | .................. G02B 6/0055 |
| | | | 385/36 |
| 2020/0089014 A1 | 3/2020 | Peng et al. | |
| 2020/0225476 A1 * | 7/2020 | Urness | ................. G02B 6/0061 |
| 2022/0057643 A1 * | 2/2022 | Eisenfeld | ........... G02B 27/0081 |
| 2023/0350204 A1 * | 11/2023 | Chriki | ................ G02B 27/0081 |

FOREIGN PATENT DOCUMENTS

| | | |
|---|---|---|
| CN | 112462519 A | 3/2021 |
| WO | 2022086755 A1 | 4/2022 |

* cited by examiner

*Primary Examiner* — Michelle R Connelly
(74) *Attorney, Agent, or Firm* — Treyz Law Group, P.C.; Michael H. Lyons

(57) ABSTRACT

A display may include a waveguide, a prism that directs a pupil of light into the waveguide, and a partial reflector between the prism and the waveguide. The partial reflector may reflect a second portion of the pupil incident from within the waveguide but not a first portion of the pupil incident from within the waveguide. This may couple some of the second portion of the pupil back into the waveguide that would otherwise be lost through the prism after a first reflection off the waveguide surface opposite the prism. The partial reflector may sacrifice luminance of the light to maximize the pupil size that can be uniformly coupled into the waveguide for propagation to the eye box while minimizing the thickness of the waveguide.

20 Claims, 11 Drawing Sheets

OPTICAL SYSTEMS WITH PARTIAL REFLECTORS ON WAVEGUIDES FOR MAXIMIZING PUPIL SIZE COUPLING

This application claims the benefit of U.S. Provisional Patent Application No. 63/394,803, filed Aug. 3, 2022, which is hereby incorporated by reference herein in its entirety.

BACKGROUND

This disclosure relates to optical systems such as optical systems in electronic devices having displays.

Electronic devices can include displays that provide images near the eyes of a user. Such electronic devices often include virtual or augmented reality headsets with displays having optical elements that allow users to view the displays. If care is not taken, components used to display images can be bulky and might not exhibit desired levels of optical performance. For example, it can be challenging to provide an eye box with uniform pupils of light that are as large as possible.

SUMMARY

An electronic device may have a display system for providing image light to an eye box. The display system may include a waveguide and an input coupling prism mounted to the waveguide. The prism may direct a pupil of image light from a projector into the waveguide.

A partial reflector may be disposed between the prism and the waveguide. The partial reflector may reflect a second portion of the pupil incident from within the waveguide but not a first portion of the pupil incident from within the waveguide. This may couple some of the second portion of the pupil back into the waveguide that would otherwise be lost through the prism after a first reflection off the waveguide surface opposite the prism.

If desired, the partial reflector may have an edge region with a gradual reflectivity. The partial reflector may include a metal coating, a dielectric film, or diffractive gratings. The partial reflector may overlap some or all of the prism. A transparent phase compensation layer may be disposed between the prism and the waveguide and overlapping a portion of the prism not covered by the partial reflector. If desired, the partial reflector may include a reflective polarizer and a quarter waveplate interposed between the partial reflector and the waveguide. Alternatively, the quarter waveplate may be disposed on an opposing side of the waveguide. The prism may be a transmissive input coupling prism or a reflective input coupling prism.

The partial reflector may sacrifice luminance of the image light to maximize the pupil size that can be uniformly coupled into the waveguide for propagation to the eye box. Maximizing pupil size may optimize the optical performance of the system. The partial reflector may allow for the waveguide to be as thin as possible while supporting such a large pupil size, thereby minimizing the volume of the waveguide and thus the weight of device.

DETAILED DESCRIPTION

Figure 1:
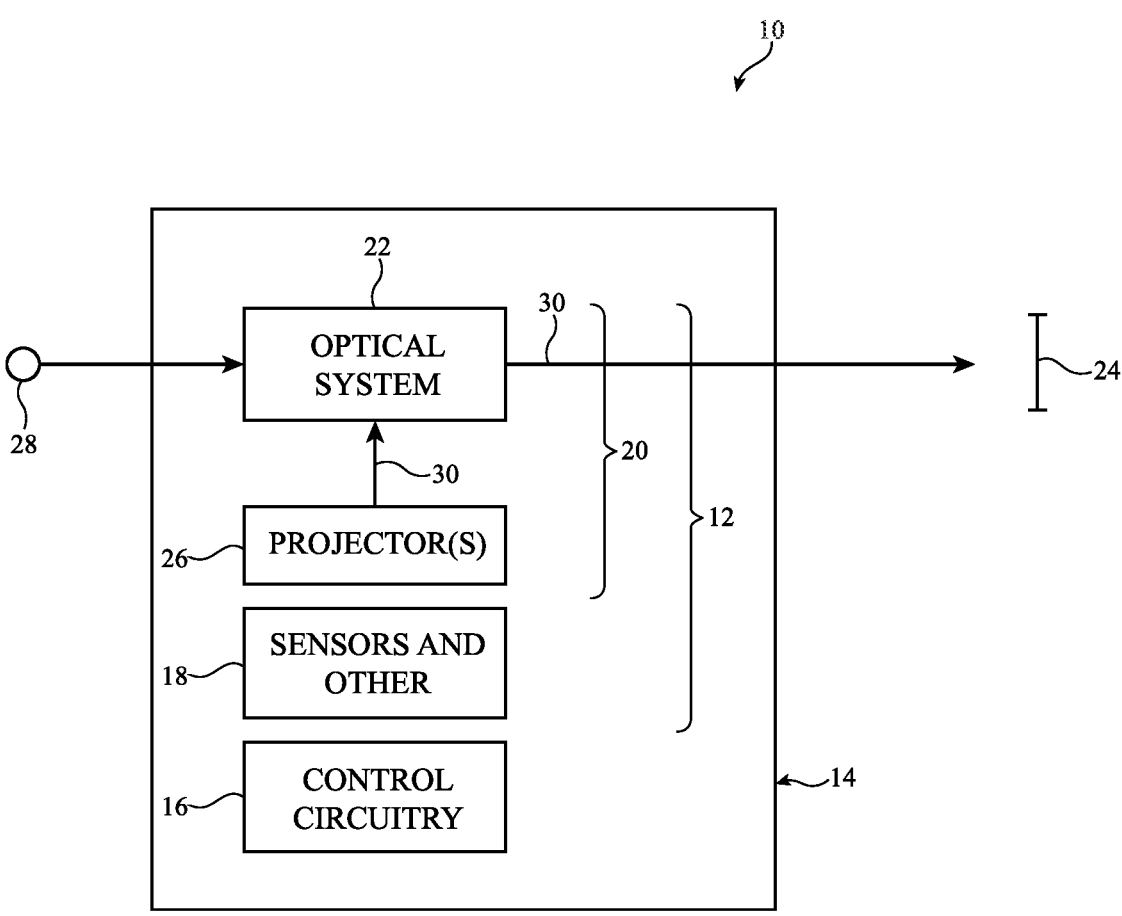
FIG. 1 is a diagram of an illustrative system having a display in accordance with some embodiments.

System 10 of FIG. 1 may be a head-mounted device having one or more displays. The displays in system 10 may include near-eye displays 20 mounted within support structure (housing) 14. Support structure 14 may have the shape of a pair of eyeglasses or goggles (e.g., supporting frames), may form a housing having a helmet shape, or may have other configurations to help in mounting and securing the components of near-eye displays 20 on the head or near the eye of a user. Near-eye displays 20 may include one or more display projectors such as projectors 26 (sometimes referred to herein as display modules 26) and one or more optical systems such as optical systems 22. Projectors 26 may be mounted in a support structure such as support structure 14. Each projector 26 may emit image light 30 that is redirected towards a user's eyes at eye box 24 using an associated one of optical systems 22. Image light 30 may be, for example, light that contains and/or represents something viewable such as a scene or object (e.g., as modulated onto the image light using the image data provided by the control circuitry to the display module).

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.).

Projectors 26 may include liquid crystal displays, organic light-emitting diode displays, laser-based displays, or displays of other types. Projectors 26 may include light sources, emissive display panels, transmissive display panels that are illuminated with illumination light from light sources to produce image light, reflective display panels such as digital micromirror display (DMD) panels and/or liquid crystal on silicon (LCOS) display panels that are illuminated with illumination light from light sources to produce image light 30, etc.

Optical systems 22 may form lenses that allow a viewer (see, e.g., a viewer's eyes at eye box 24) to view images on display(s) 20. There may be two optical systems 22 (e.g., for forming left and right lenses) associated with respective left and right eyes of the user. A single display 20 may produce images for both eyes or a pair of displays 20 may be used to display images. In configurations with multiple displays (e.g., left and right eye displays), the focal length and positions of the lenses formed by system 22 may be selected so that any gap present between the displays will not be visible to a user (e.g., so that the images of the left and right displays overlap or merge seamlessly).

If desired, optical system 22 may contain components (e.g., an optical combiner, etc.) to allow real-world image light from real-world images or objects to be combined optically with virtual (computer-generated) images such as virtual images in image light 30. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement in which a camera captures real-world images of external objects and this content is digitally merged with virtual content at optical system 22).

System 10 may, if desired, include wireless circuitry and/or other circuitry to support communications with a computer or other external equipment (e.g., a computer that supplies display 20 with image content). During operation, control circuitry 16 may supply image content to display 20. The content may be remotely received (e.g., from a computer or other content source coupled to system 10) and/or may be generated by control circuitry 16 (e.g., text, other computer-generated content, etc.). The content that is supplied to display 20 by control circuitry 16 may be viewed by a viewer at eye box 24.

Figure 2:
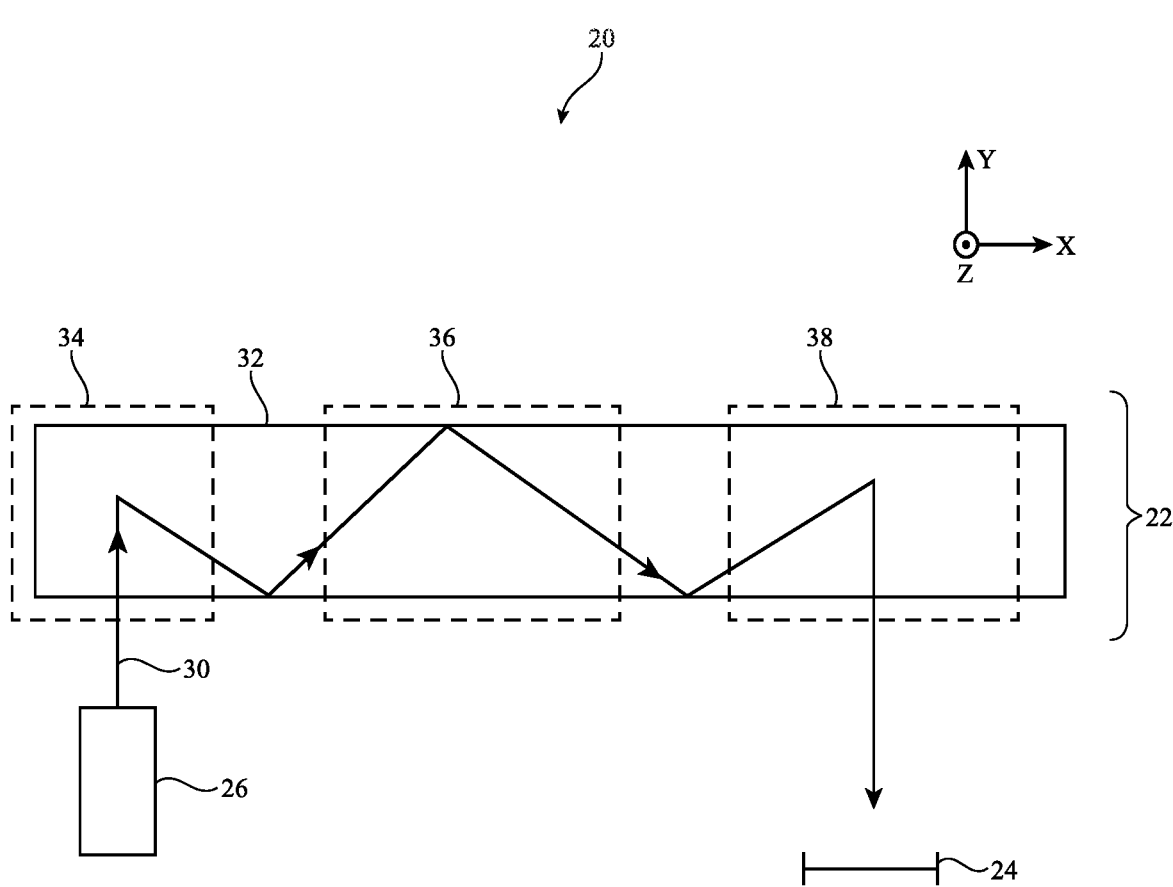
FIG. 2 is a top view of an illustrative optical system for a display having a waveguide with optical couplers in accordance with some embodiments.

FIG. 2 is a top view of an illustrative display 20 that may be used in system 10 of FIG. 1. As shown in FIG. 2, near-eye display 20 may include a projector such as projector 26 and an optical system such as optical system 22. Optical system 22 may include optical elements such as one or more waveguides 32. Waveguide 32 may include one or more stacked substrates (e.g., stacked planar and/or curved layers sometimes referred to herein as waveguide substrates) of optically transparent material such as plastic, polymer, glass, etc.

If desired, waveguide 32 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguide 32 may include holographic phase gratings such as volume holograms or thin-film holograms, meta-gratings, or any other desired diffractive grating structures. The diffractive gratings on waveguide 32 may also include surface relief gratings (SRGs) formed on one or more surfaces of the substrates in waveguide 32, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles). Other light redirecting elements such as louvered mirrors may be used in place of diffractive gratings in waveguide 32 if desired.

As shown in FIG. 2, projector 26 may generate (e.g., produce and emit) image light 30 associated with image content to be displayed to eye box 24 (e.g., image light 30 may convey a series of image frames for display at eye box 24). Image light 30 may be collimated using a collimating lens in projector 26 if desired. Optical system 22 may be used to present image light 30 output from projector 26 to eye box 24. If desired, projector 26 may be mounted within support structure 14 of FIG. 1 while optical system 22 may be mounted between portions of support structure 14 (e.g., to form a lens that aligns with eye box 24). Other mounting arrangements may be used, if desired.

Optical system 22 may include one or more optical couplers (e.g., light redirecting elements) such as input coupler 34, cross-coupler 36, and output coupler 38. In the example of FIG. 2, input coupler 34, cross-coupler 36, and output coupler 38 are formed at or on waveguide 32. Input coupler 34, cross-coupler 36, and/or output coupler 38 may be completely embedded within the substrate layers of waveguide 32, may be partially embedded within the substrate layers of waveguide 32, may be mounted to waveguide 32 (e.g., mounted to an exterior surface of waveguide 32), etc.

Waveguide 32 may guide image light 30 down its length via total internal reflection. Input coupler 34 may be configured to couple image light 30 from projector 26 into waveguide 32 (e.g., within a total-internal reflection (TIR) range of the waveguide within which light propagates down the waveguide via TIR), whereas output coupler 38 may be configured to couple image light 30 from within waveguide 32 (e.g., propagating within the TIR range) to the exterior of waveguide 32 and towards eye box 24 (e.g., at angles outside of the TIR range). Input coupler 34 may include an input coupling prism, an edge or face of waveguide 32, a lens, a steering mirror or liquid crystal steering element, diffractive grating structures (e.g., volume holograms, SRGs, etc.), partially reflective structures (e.g., louvered mirrors), or any other desired input coupling elements.

As an example, projector 26 may emit image light 30 in direction +Y towards optical system 22. When image light 30 strikes input coupler 34, input coupler 34 may redirect image light 30 so that the light propagates within waveguide 32 via total internal reflection towards output coupler 38 (e.g., in direction +X within the TIR range of waveguide 32). When image light 30 strikes output coupler 38, output coupler 38 may redirect image light 30 out of waveguide 32 towards eye box 24 (e.g., back along the Y-axis). In implementations where cross-coupler 36 is formed on waveguide 32, cross-coupler 36 may redirect image light 30 in one or more directions as it propagates down the length of waveguide 32 (e.g., towards output coupler 38 from a direction of propagation as coupled into the waveguide by the input coupler). In redirecting image light 30, cross-coupler 36 may also perform pupil expansion on image light 30 in one or more directions. Cross-coupler 36 may therefore sometimes also be referred to herein as pupil expander 36 or optical expander 36. If desired, output coupler 38 may also expand image light 30 upon coupling the image light out of waveguide 32.

Input coupler 34, cross-coupler 36, and/or output coupler 38 may be based on reflective and refractive optics or may be based on diffractive (e.g., holographic) optics. In arrangements where couplers 34, 36, and 38 are formed from reflective and refractive optics, couplers 34, 36, and 38 may include one or more reflectors (e.g., an array of micromirrors, partial mirrors, louvered mirrors, or other reflectors). In arrangements where couplers 34, 36, and 38 are based on diffractive optics, couplers 34, 36, and 38 may include diffractive gratings (e.g., volume holograms, surface relief gratings, etc.). In one illustrative implementation, input coupler 34 may include an input coupling prism.

The example of FIG. 2 is merely illustrative. Optical system 14B may include multiple waveguides that are laterally and/or vertically stacked with respect to each other.

Each waveguide may include one, two, all, or none of couplers 34, 36, and 38. Waveguide 32 may be at least partially curved or bent if desired. One or more of couplers 34, 36, and 38 may be omitted. If desired, optical system 22 may include a single optical coupler that performs the operations of both cross-coupler 36 and output coupler 38 (sometimes referred to herein as an interleaved coupler, a diamond coupler, or a diamond expander) or cross-coupler 36 may be separate from output coupler 38.

Figure 3:
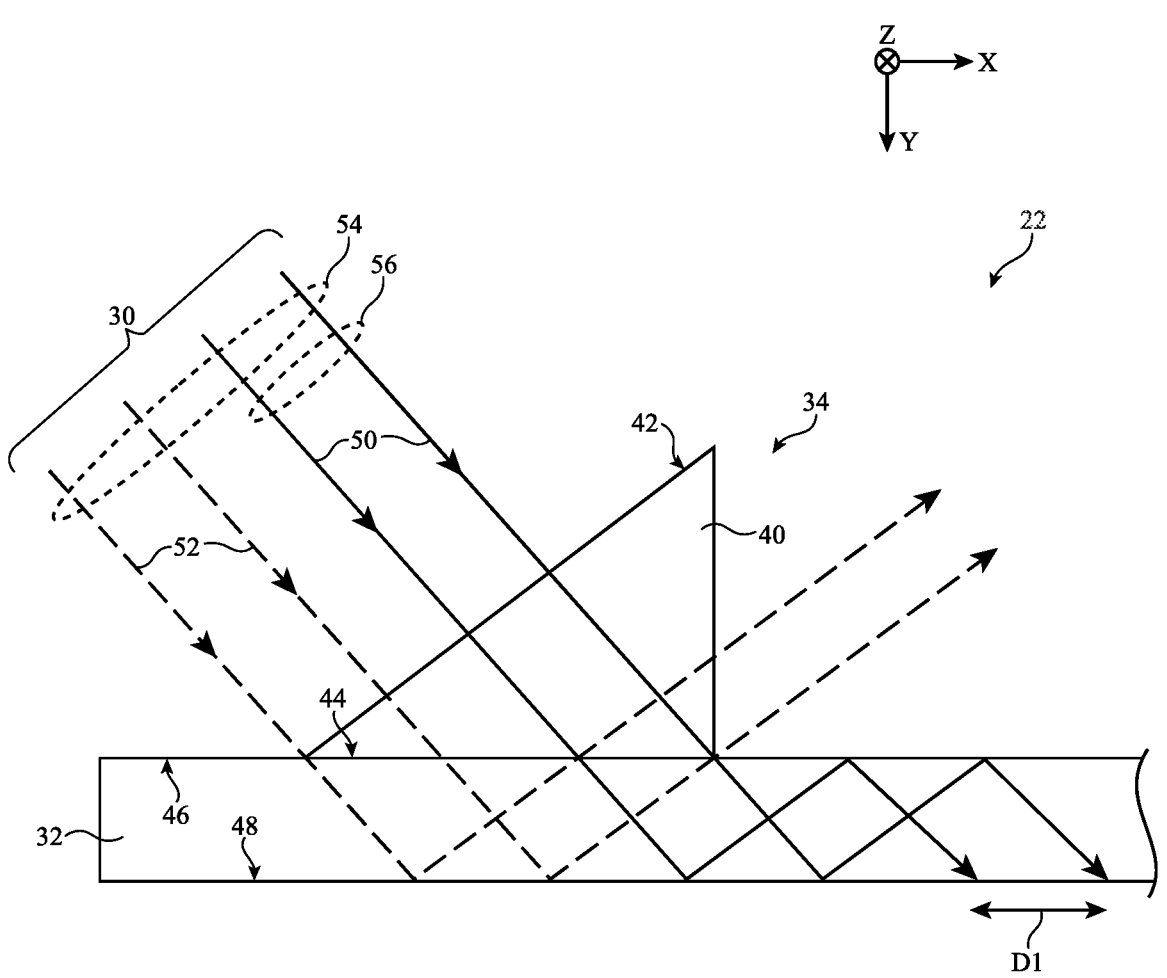
FIG. 3 is a top view of an illustrative optical system having a waveguide with an input coupling prism in accordance with some embodiments.

FIG. 3 is a top view showing one example of how input coupler 34 may include an input coupling prism. As shown in FIG. 3, input coupler 34 may include an input coupling prism such as prism 40. Prism 40 may have a first surface (face) 44 and may have a second (light-receiving) surface (face) 42 that is tilted with respect to first surface 44. Waveguide 32 may have a first lateral surface 46 and an opposing second lateral surface 48. Lateral surfaces 46 and 48 may be defined by one or more waveguide substrates and/or media layers in waveguide 32. Surface 44 of prism 40 may be mounted to, at, or adjacent lateral surface 46 of waveguide 32.

Prism 40 may receive image light 30 through surface 42. As shown by rays 52 and 50 of image light 30, prism 40 may couple image light 30 into waveguide 32 at angles such that image light 30 propagates along waveguide 32 via total internal reflection (TIR). The pupil size of image light 30 that can be coupled into waveguide 32 is one of the most important architecture parameters for optical system 22. Pupil size determines the resolution limit (e.g., diffraction limit) of the system and affects pupil replication image uniformity artifacts. It is generally desirable to make the pupil as large as possible. However, the maximum size of the pupil along the beam propagation direction is limited by the thickness of waveguide 32 (e.g., measured parallel to the Y-axis). This is because, after a first reflection off lateral surface 48, some of the pupil can fall onto an area of lateral surface 46 overlapping (covered by) surface 44 of prism 40. This can break TIR for that portion of the pupil and the light will be out-coupled and lost. At the same time, it is generally desirable for waveguide 32 to be as thin as possible to minimize the size of system 10.

For example, as shown in FIG. 3, it may be desirable for image light 30 to be coupled into waveguide 32 with a relatively large pupil (beam) size such as within pupil (beam) 54. A first portion of the image light 30 within pupil 54 such as the portion of the beam between rays 50 (and extending to the uppermost ray 52) may be coupled into waveguide 32 by prism 40. The first portion may first reflect off lateral surface 48 of waveguide 32 (in a first TIR reflection) and may then may reflect off lateral surface 46 of waveguide 32 (in a second TIR reflection) as the image light propagates via TIR. However, given that waveguide 32 is relatively thin, a second portion of the image light 30 within pupil 54 closest to the bottom edge of prism 40 such as the portion of the beam between rays 52 will be coupled into waveguide 32 by prism 40, will reflect off lateral surface 48 (in a first TIR reflection), and will then be incident upon a portion (area or region) of lateral surface 46 of waveguide 32 that overlaps surface 44 of prism 40. The presence of prism 40 over this portion of lateral surface 46 may break the TIR condition for the second portion of the image light (e.g., between rays 52), causing this light to escape waveguide 32 and be lost.

If care is not taken, this geometry will prevent the second portion of image light 30 from being viewable at eye box 24 (FIG. 2). Alternatively, image light 30 may be confined to a smaller pupil such as within pupil (beam) 56, which may allow all of the image light 30 incident upon prism 34 to reflect off portions of lateral surface 46 that are non-overlapping with prism 40 (e.g., upon the second TIR reflection of the light within waveguide 32). However, this may limit image light 30 to a relatively small pupil size D1, which limits overall performance of system 10 in displaying images at eye box 24.

While pupil size can be increased by changing the incident angle of image light 30 upon prism 40, this may be insufficient to accommodate the relatively large field of view (FOV) of projector 26, which is carried by the waveguide to the eye box. Similarly, while pupil size can be increased by increasing the thickness of waveguide 32, this may undesirably increase the volume consumed by optical components 22 in system 10 and may undesirably increase the weight of system 10 (e.g., such that system 10 becomes bulky or uncomfortable to wear). In addition, this may be ineffective for mitigating pupil replication artifacts, since these depend on the ratio of pupil size to waveguide thickness, and may increase other artifacts such as rainbow artifacts and see-through smear.

To mitigate these issues and to allow for a relatively large pupil of image light 30 (e.g., all portions of pupil 54) to be coupled into waveguide 32 and conveyed to the eye box, optical system 22 may be provided with a partial reflector overlapping prism 40. The tradeoff between pupil size and waveguide thickness is based on the fundamental limitation of etendue. In general, it may not be possible to squeeze a large image beam into a small image beam inside the waveguide while keeping the same FOV. The etendue limitation, however, only limits the luminance of the beam. Therefore, etendue can be decreased so long as some power is lost, such that the luminance remains the same or decreases. The fundamental limit is that, to increase beam size by a factor of two, at least 50% of the light must be lost. The partial reflector may cause at least some of the second portion of image light 30 to be reflected back into waveguide 32 (e.g., in a second TIR reflection within waveguide) after the first TIR reflection off lateral surface 48 rather than being transmitted through prism 40 and lost. This may ensure that the pupil can be as large as possible while remaining uniform, positively affecting the resolution limit of system 10.

Figure 4:
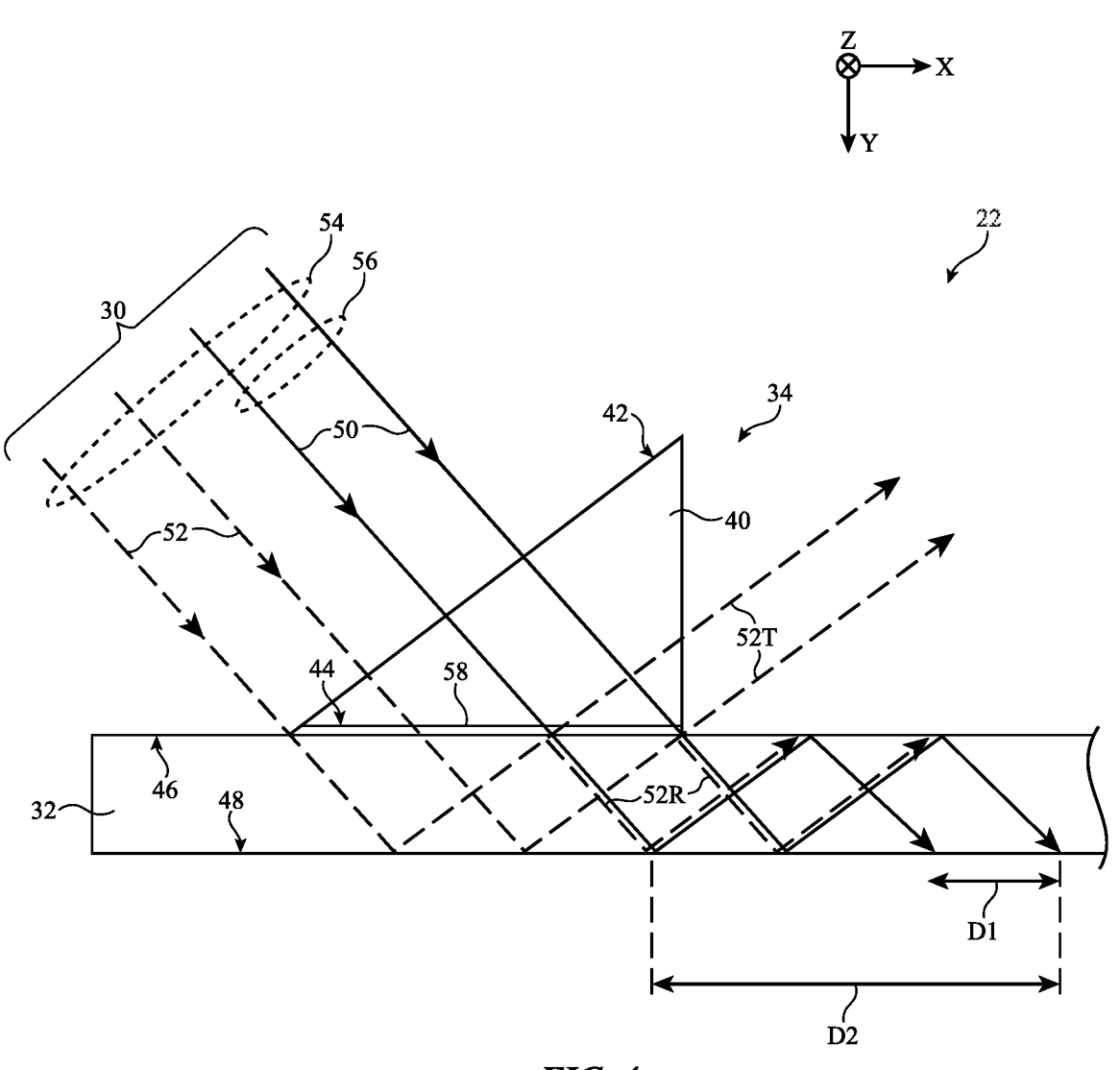
FIG. 4 is a top view of an illustrative optical system having an input coupling prism with a partial reflector for maximizing the size of a pupil of light coupled into a waveguide by the input coupling prism in accordance with some embodiments.

FIG. 4 is a diagram showing one example of how optical system 22 may be provided with a partial reflector overlapping prism 40. As shown in FIG. 4, a partial reflector such as partial reflector 58 may be layered onto lateral surface 46 of waveguide 32. Partial reflector 58 may overlap prism 40 (e.g., may overlap an entirety of surface 44 of prism 40). Partial reflector 58 may contact both surface 44 of prism 40 and lateral surface 46 of waveguide 32 if desired (e.g., partial reflector 58 may be sandwiched between surface 44 of prism 40 and lateral surface 46 of waveguide 32).

Partial reflector 58 (sometimes referred to herein as partial mirror 58, reflector 58, or mirror 58) may be a semi-transparent mirror having a reflectivity less than 100% and greater than 0%. Partial reflector 58 may, for example, be 50% reflective and 50% transmissive. In other words, partial reflector 58 may transmit 50% of incident light while reflecting 50% of incident light (e.g., partial reflector 58 may be a 50-50 partial reflector). Partial reflector 58 may be formed from metal (e.g., one or more metal coatings such as a silver or aluminum coating) and/or dielectric (e.g., a thin-film interference filter formed from a stack of dielectric thin films that may, for example, eliminate absorption losses associated with metal mirrors). In other implementations, partial reflector 58 may include a set of one or more diffraction gratings (e.g., volume holograms, surface relief gratings, etc.) that transmit and/or reflect light as described herein (e.g., via diffraction in transmissive and/or reflective diffraction modes/orders).

Prism 40 may couple image light 30 into waveguide 32 through partial reflector 58. While some of the incident image light 30 will be reflected by partial reflector 58, this reflection is not shown in FIG. 4 for the sake of clarity. Partial reflector 58 may transmit image light 30 (e.g., the amount of the incident image light 30 that was not reflected) into waveguide 32. As shown by rays 50, the first portion of image light 30 (e.g., the first portion of pupil 54) may first reflect off lateral surface 48 and then off a portion of lateral surface 46 that is not overlapping prism 40 as the light propagates via TIR.

As shown by rays 52, the second portion of image light 30 (e.g., the second portion of pupil 54) may first reflect off lateral surface 48 and may then be incident upon partial reflector 58 from within waveguide 32. Partial reflector 58 may transmit some of the second portion of image light 30, as shown by rays 52T. However, partial reflector 58 may also reflect some of the second portion of image light 30 back into waveguide 32, as shown by rays 52R. The image light 30 associated with rays 52R will reflect off lateral surface 48 of waveguide 32 and may then reflect off a portion of lateral surface 46 that is non-overlapping with respect to prism 40 (e.g., in the fourth TIR bounce of the light within waveguide 32) as the light propagates via TIR.

This may serve to effectively cause the pupil of image light 30 that reaches eye box 24 to exhibit pupil size D2 (e.g., the size of pupil 54), which is much larger than the pupil size D1 associated with rays 50. At the same time, in implementations where partial reflector 58 is 50% reflective, the entire pupil 54 loses 50% of its light when image light 30 is first reflected by partial reflector 58 after first passing through prism 40. In addition, the second portion of pupil 54 (between rays 52) loses an additional 50% of its light after reflecting off partial reflector 58 from within waveguide 32, as shown by rays 52R (e.g., where 50% of the second portion of pupil 54 is lost, as shown by rays 52T). This therefore causes image light 30 to exhibit an overall efficiency of ~37.5% after being coupled into waveguide 32. However, in terms of the overall optical performance of system 10, the effective increase in the size of the pupil of image light 30 from pupil size D1 to pupil size D2 may outweigh this loss in efficiency.

Figure 5:
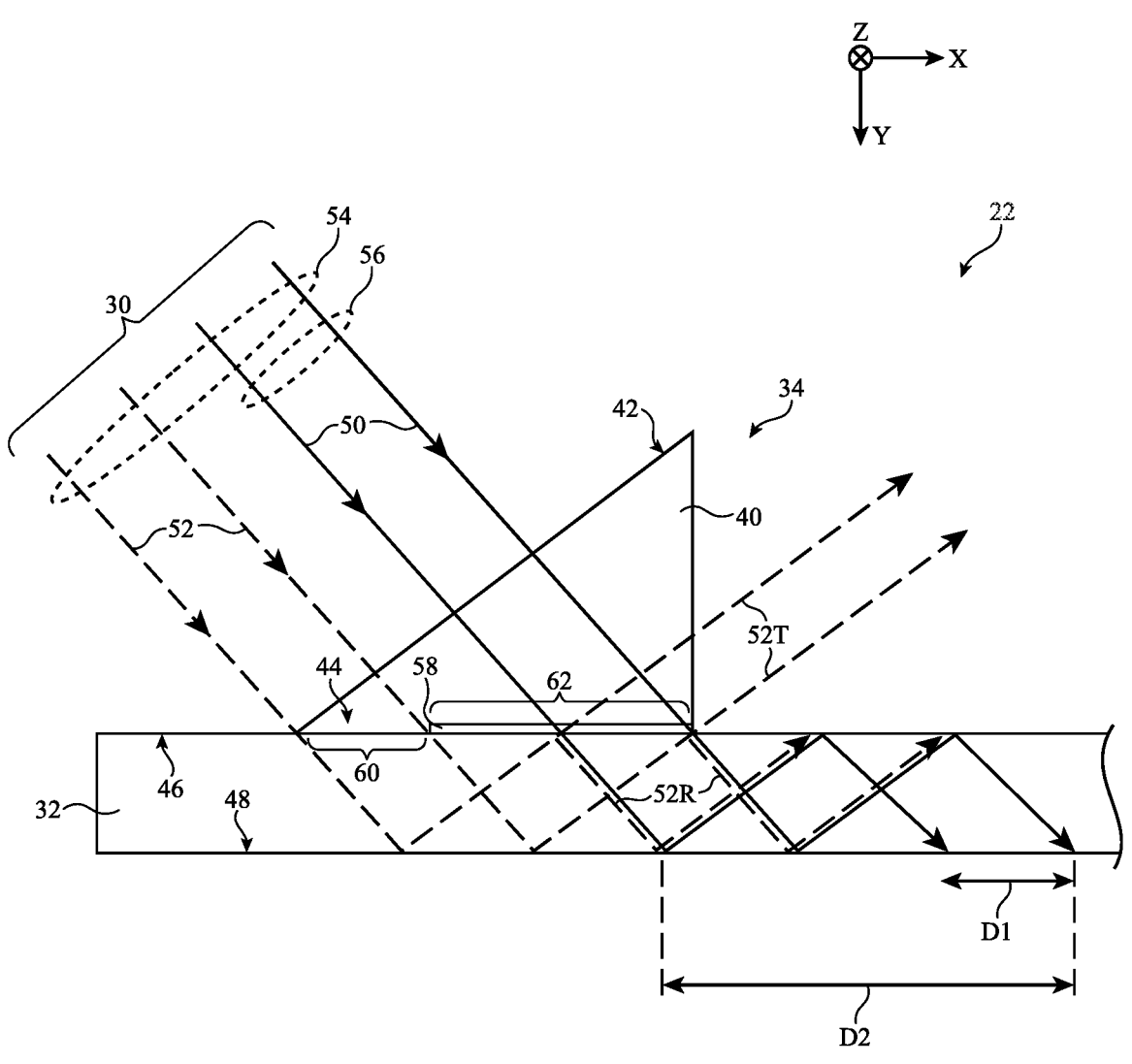
FIG. 5 is a top view of an illustrative optical system having an input coupling prism with a partial reflector that overlaps a portion of the input coupling prism in accordance with some embodiments.

In the example of FIG. 4, partial reflector 58 covers (overlaps) all of surface 44 of prism 40. This is merely illustrative. If desired, partial reflector 58 may cover (overlap) only a portion of surface 44 (whereas the remainder of surface 44 does not overlap partial reflector 58). FIG. 5 is a diagram showing one example of how partial reflector 58 may overlap some but not all of prism 40.

As shown in FIG. 5, partial reflector 58 may be disposed at, on, or overlapping a first region (area or portion) 62 of surface 44 of prism 40. A second region (area or portion) 60 of surface 44 of prism 40 may be uncovered (e.g., partial reflector 58 may overlap first region 62 but not second region 60). The size and placement of first region 62 may be selected so that partial reflector 58 overlaps only the region, area, or portion of surface 44 of prism 40 that receives the second portion of image light 30 (e.g., between rays 52) after the first TIR reflection of the second portion of image light 30 off lateral surface 48, for example. The portion, region, or area of surface 44 of prism 40 that does not receive reflected light between rays 52 may be non-overlapping with respect to partial reflector 58 (e.g., may form region 60).

Prism 40 may thereby couple the second portion of image light 30 incident upon prism 40 (between rays 52) into waveguide 32 through region 60 of surface 44. This may help to reduce light loss for the second portion of image light 30 by eliminating loss from the reflection of the second portion of image light 30 after first passing through prism 40 (e.g., helping to counteract the loss from the second portion of image light 30 due to reflection off partial reflector 58 from within waveguide 32). This may help to keep the intensity of the pupil of image light 30 uniform across pupil size D2, since the amount of loss due to reflection off partial reflector 58 will be approximately equal between the first portion of image light 30 (e.g., rays 50 transmitted through prism 40 and partial reflector 58) and the second portion of image light 30 (e.g., rays 52 reflected off partial reflector 58 from within waveguide 32). In practice, the image light 30 incident upon prism 40 contains different incident angles and the area that can be mirror-free might not perfectly overlap for different angles.

It can be difficult to ensure that each portion of the pupil of image light 30 interacts with partial reflector 58 only once, especially if the interaction needs to occur for all field angles. It is possible that some portions of the beam will interact with the partial reflector twice, thus reducing the intensity of those portions, or zero times, causing those portions to be lost back into the prism. To avoid possible diffraction artifacts due to these effects, partial reflector 58 may have one or more gradual (graduated) edges such that the reflectivity (reflection coefficient) of partial reflector 58 changes gradually rather than abruptly at those edge(s). This may help to ensure that the coupled pupils do not have sharp edges.

Figure 6:
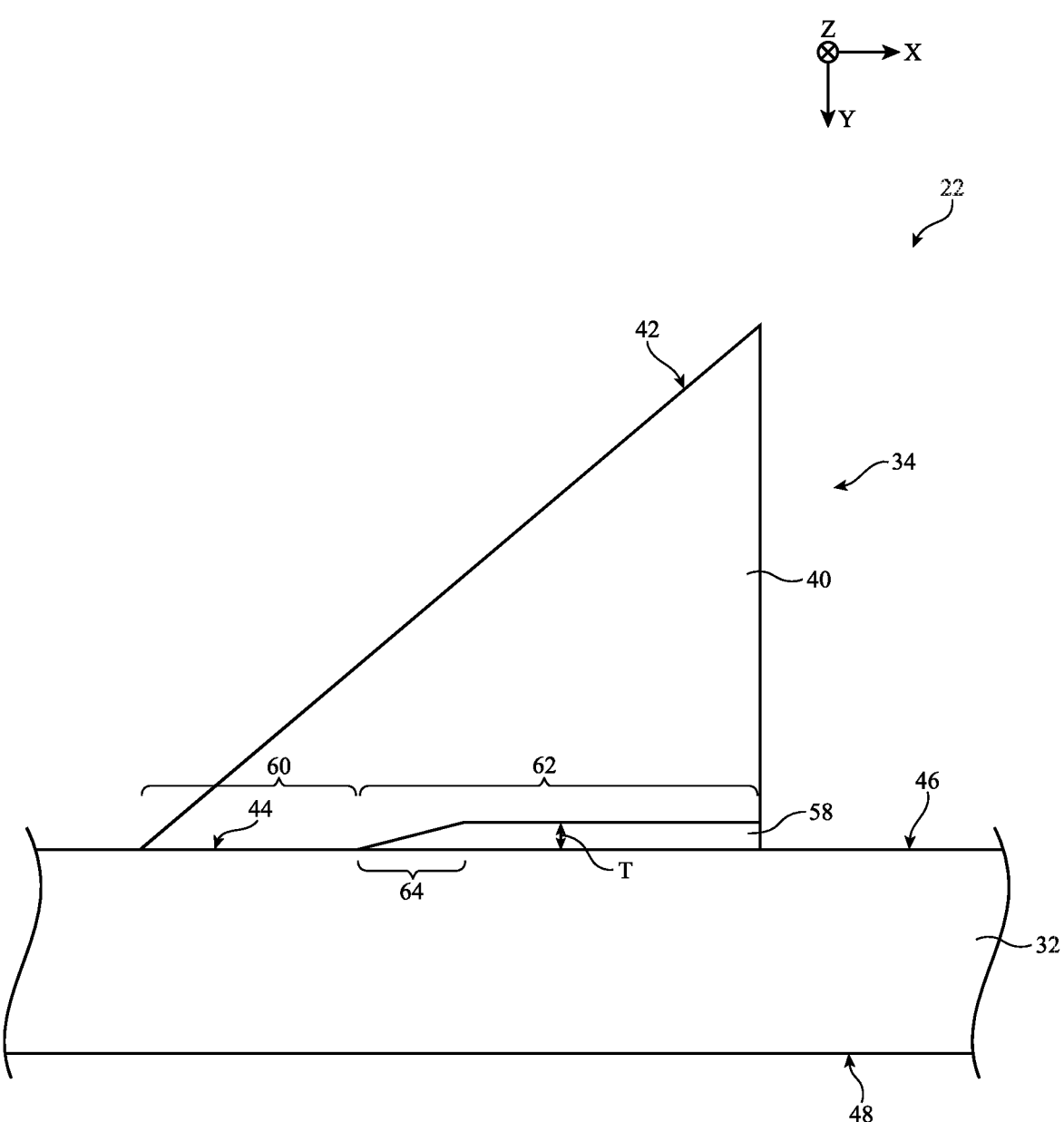
FIG. 6 is a top view of an illustrative optical system having an input coupling prism with a partial reflector that has an edge with a gradual reflectivity in accordance with some embodiments.

FIG. 6 is a diagram showing one example of how partial reflector 58 may have an edge with a gradual reflectivity. As shown in FIG. 6, partial reflector 58 may have an edge region 64 at the uncovered region 60 of surface 44 (e.g., where edge region 64 includes the edge of partial reflector 58 at/abutting region 60 of surface 44). Partial reflector 58 may exhibit peak reflectivity outside of edge region 64. Within edge region 64, partial reflector 58 may exhibit a gradual (varying) reflectivity that decreases from the peak reflectivity outside of edge region 64 to a reflectivity of zero at region 60 of surface 44.

Partial reflector 58 may include any desired structures that configure edge region 64 to exhibit the gradual reflectivity. For example, edge region 64 may have a thickness that decreases from a peak thickness T to a thickness of zero at region 60 of surface 44 (e.g., in implementations where partial reflector 58 includes a metal coating). Edge region 64 may, for example, be an angled, cut, thinned, tapered, or tilted edge of the partial reflector. Edge region 64 may sometimes be referred to herein as apodised region 64, tapered region 64, transition region 64, or angled region 64 of partial reflector 58. In implementations where partial reflector 58 includes dielectric thin films, edge region 64 may take advantage of the angular dependence of reflection such that the area covered by the partial reflector for each field angle matches the area that the field angle is incident upon.

Figure 7:
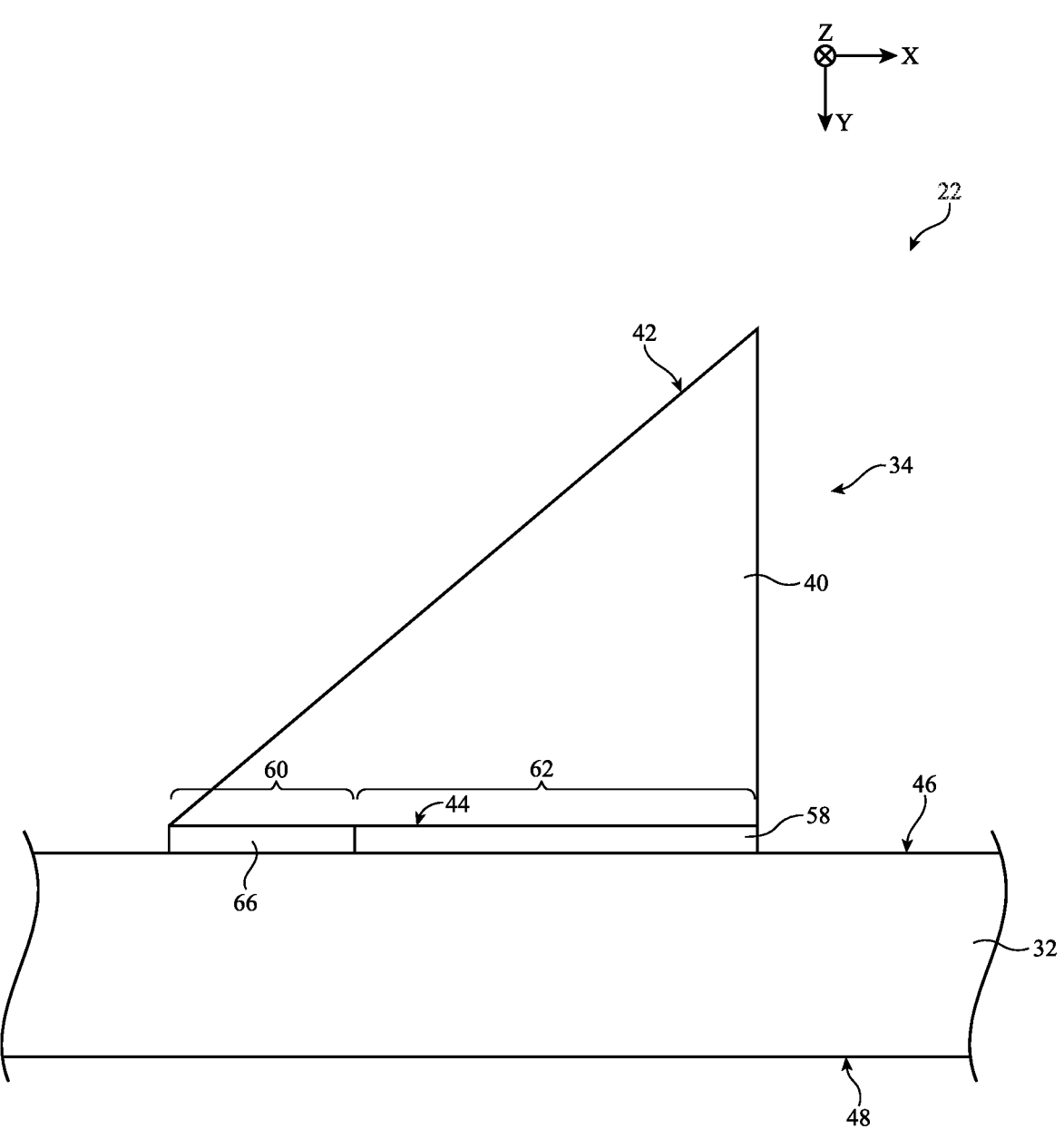
FIG. 7 is a top view of an illustrative optical system having an input coupling prism with a partial reflector and a transparent phase compensation layer in accordance with some embodiments.

The examples of FIGS. 5 and 6 in which region 60 of surface 44 directly contacts lateral surface 46 of waveguide 32 are merely illustrative. If desired, a transparent phase compensation layer may be disposed on region 60 of surface 44. FIG. 7 is a diagram showing one example of how a transparent phase compensation layer may be layered onto/under region 60 of surface 44.

As shown in FIG. 7, input coupler 34 may include a transparent phase compensation layer such as transparent phase compensation layer 66. Transparent phase compensation layer 66 may overlap region 60 of surface 44 (e.g., may be interposed or sandwiched between region 60 of surface 44 and lateral surface 46 of waveguide 32). In other words, transparent phase compensation layer 66 may fill/overlap region 60 whereas partial reflector 58 fills/overlaps region 62 of surface 44 on prism 40. Transparent phase compensation layer 66 may transmit the second portion of image light 30 into waveguide 32 (e.g., the portion of image light 30 between rays 52 of FIGS. 3-5) whereas partial reflector 58 transmits the first portion of image light 30 into waveguide 32 (e.g., the portion of image light 30 associated with rays 50 of FIGS. 3-5).

In the absence of transparent phase compensation layer 66, the second portion of image light 30 (e.g., rays 52 of FIGS. 3-5) may exhibit a different phase when interacting with partial reflector 58 (e.g., after the first TIR reflection of the second portion off lateral surface 48) than the first portion of image light (e.g., rays 50 of FIGS. 3-5) that is incident upon partial reflector 58 through prism 40. This may have a negative impact on the resolution limit of the pupil. Transparent phase compensation layer 66 may mitigate these effects by phase-shifting the second portion of image light 30 transmitted through transparent phase compensation layer 66. The phase shift imparted by transparent phase compensation layer 66 may be such that, after all reflections by the first and second portions of the image light, the phase of the image light is constant (uniform) across the pupil. Transparent phase compensation layer 66 may, for example, be a thin film layer of material with a refractive index that is different from that of the immersion liquid (e.g., optically clear adhesive) between prism 40 and waveguide 32.

Figure 8:
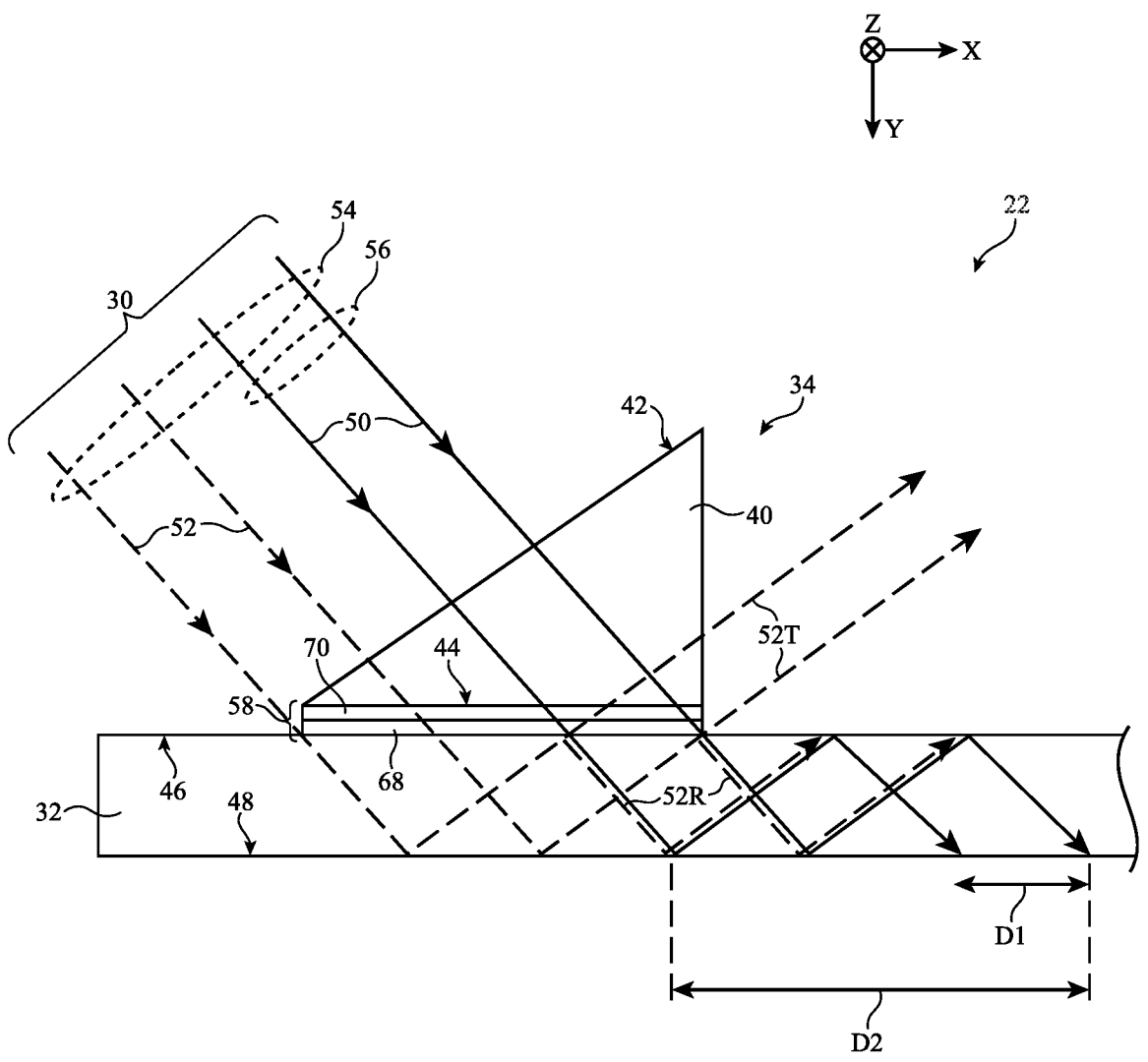
FIG. 8 is a top view of an illustrative optical system having an input coupling prism with a reflective polarizer and a quarter wave plate in accordance with some embodiments.

If desired, partial reflector 58 may include a reflective polarizer and a quarter waveplate. FIG. 8 is a diagram showing one example of how partial reflector 58 may include a reflective polarizer and a quarter waveplate. As shown in FIG. 8, partial reflector 58 may include a phase retarder such as quarter waveplate (QWP) 68 and a reflective polarizer (RP) such as reflective polarizer 70. QWP 68 may be layered onto lateral surface 46 of waveguide 32. Reflective polarizer 70 may be layered onto QWP 68 (e.g., QWP 68 may be interposed or sandwiched between reflective polarizer 70 and waveguide 32). In the example of FIG. 8, reflective polarizer 70 and QWP 68 cover or overlap all of surface 44 of prism 40. This is merely illustrative and, if desired, reflective polarizer 70 and/or QWP 68 may cover only a portion of surface 44 (e.g., region 62 of FIGS. 5-7).

Reflective polarizer 70 may receive unpolarized image light 30 through prism 40. Reflective polarizer 70 may transmit light of a first linear polarization while reflecting light of a second linear polarization orthogonal to the first linear polarization. Reflective polarizer 70 may transmit linear polarized light from the unpolarized image light 30 (e.g., image light 30 with the first linear polarization) without passing other polarizations of image light 30. This may, for example, effectively remove half of the brightness of image light 30 from the optical path. The image light 30 having the first linear polarization may then pass through QWP 68 and into waveguide 32 (e.g., with a first circular polarization).

The first portion of image light 30 (e.g., rays 50) passes through QWP 68 once and maintains circular polarization while propagating along waveguide 32. However, the second portion of image light 30 (e.g., between rays 52) is incident upon QWP 68 after its first TIR reflection off lateral surface 48. The first reflection off lateral surface 48 may reverse the circular polarization of the second portion of image light 30 (e.g., to a second circular polarization opposite the first circular polarization). The second portion of image light 30 incident from within waveguide 32 is then transmitted for a second time by QWP 68. This second transmission through QWP 68 converts the second portion of the image light to linear polarized light having the second linear polarization orthogonal to the first linear polarization. Since reflective polarizer 70 transmits light of the first linear polarization while reflecting light of the second linear polarization, reflective polarizer 70 may reflect the second portion of the image light having the second linear polarization, which then passes through QWP 68 for a third time and is coupled back into waveguide 32 with a circular polarization (as shown by rays 52R).

Figure 9:
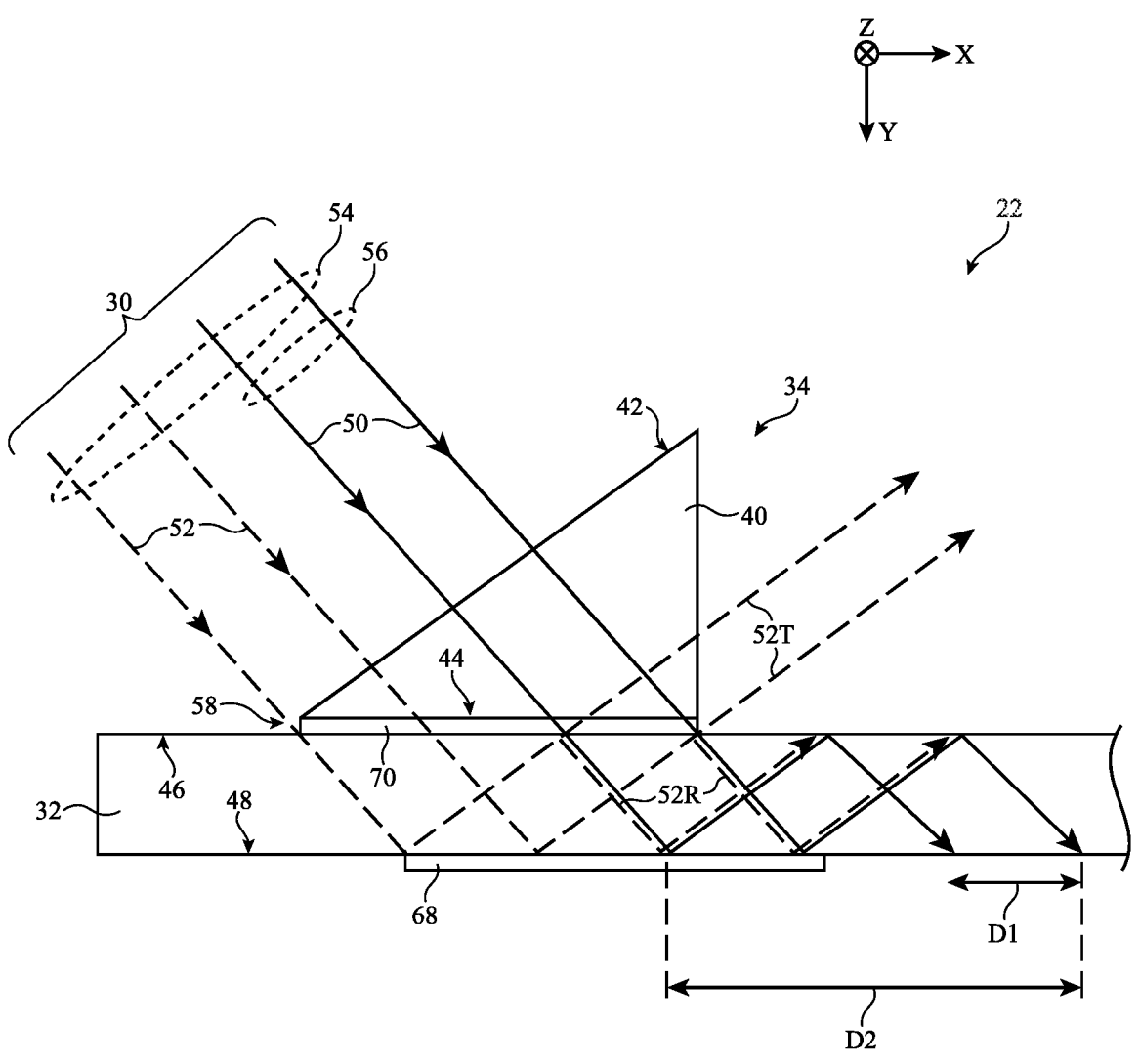
FIG. 9 is a top view of an illustrative optical system having an input coupling prism with a reflective polarizer and having a quarter wave plate disposed on opposing sides of a waveguide in accordance with some embodiments.

The example of FIG. 8 is merely illustrative. In other implementations, QWP 68 may be disposed on lateral surface 48 of waveguide 32 (e.g., QWP 68 and reflective polarizer 70 may be disposed on opposing sides of waveguide 32), as shown in the example of FIG. 9. As shown in FIG. 9, reflective polarizer 70 may be layered onto lateral surface 46 of waveguide 32. QWP 68 may overlap the portion of lateral surface 48 that receives the pupil of image light 30 transmitted through reflective polarizer 70 (e.g., may partially overlap prism 40 and may be partially non-overlapping with respect to prism 40).

Disposing reflective polarizer 70 and QWP 68 on waveguide 32 may configure optical system 22 to nominally achieve 50% efficiency with a uniform intensity pupil. If desired, an efficiency of greater than 50% can be achieved if image light 30 is emitted by projector 26 as partially polarized or if waveguide 32 exhibits higher efficiency for one of the polarizations (e.g., for a given input coupling geometry, there will be some efficiency loss but the overall system efficiency may be higher if the input coupling system launches light at a preferred polarization state such that the output coupler has higher efficiency).

The examples of two or more of FIGS. 4-9 may be combined if desired. In the examples of FIGS. 4-9, prism 40 is a transmissive input coupling prism that transmits image light 30 into waveguide 32. If desired, input coupler 34 may include a reflective input coupling prism that couples (reflects) image light 30 into waveguide 32. In other words, partial reflector 58 of FIGS. 4-9 may equivalently be disposed overlapping a reflective input coupling prism.

Figure 10:
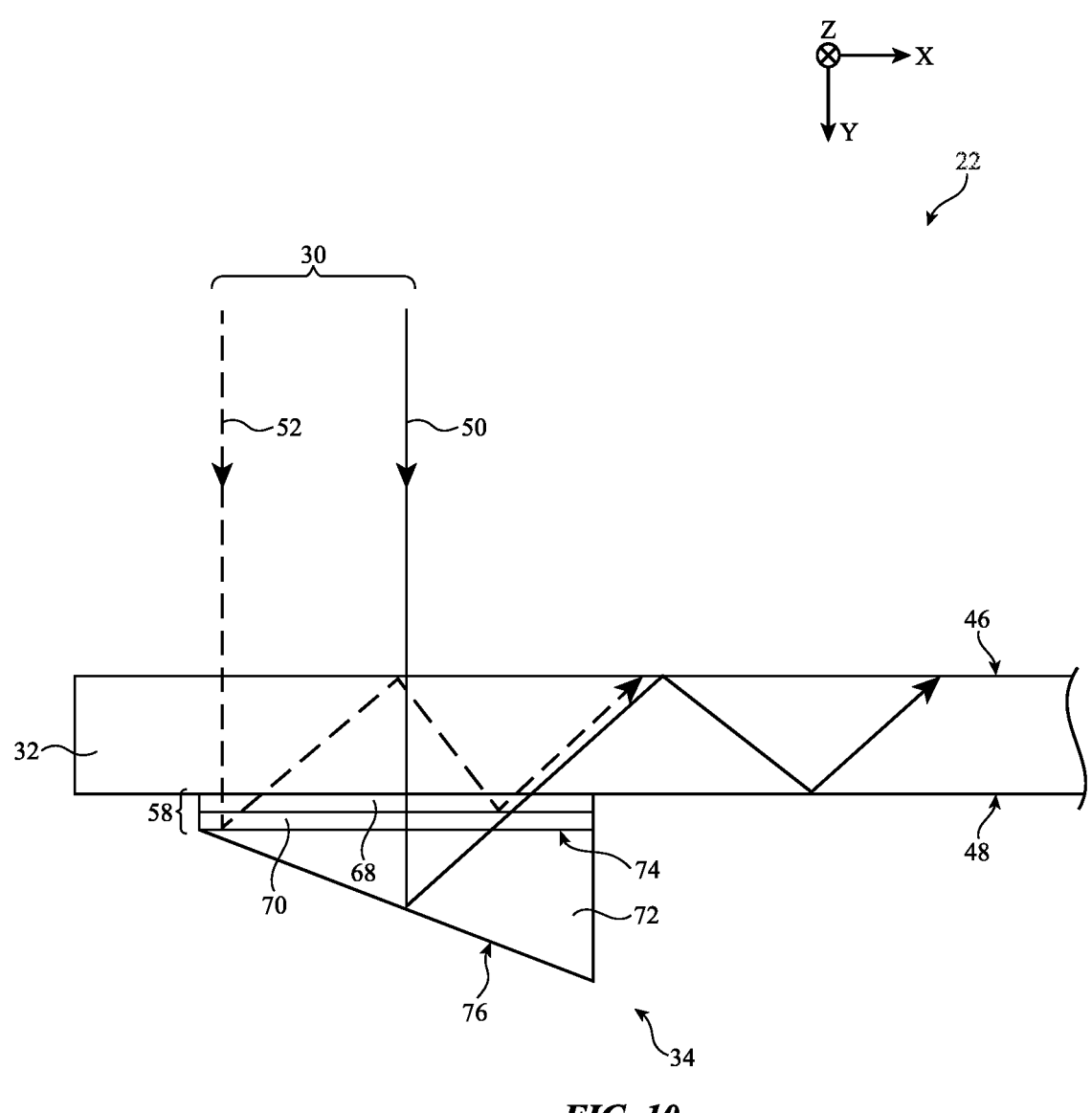
FIG. 10 is a top of an illustrative optical system having a reflective input coupling prism with a reflective polarizer and a quarter wave plate in accordance with some embodiments.

FIG. 10 is a diagram showing one example in which input coupler 34 includes QWP 68 and reflective polarizer 70 overlapping a reflective input coupling prism. As shown in FIG. 10, input coupler 34 may include a reflective input coupling prism such as prism 72. Prism 72 may have a first surface 74 and a second surface 76 oriented at a non-zero angle with respect to first surface 74. Second surface 76 may be the reflective surface of prism 72 and may therefore sometimes be referred to herein as reflective surface 76. Surface 74 of prism 72 may be mounted to lateral surface 48 of waveguide 32 (e.g., opposite the incident image light 30). Partial reflector 58 may be layered (sandwiched) between prism 72 and lateral surface 48 of waveguide 32.

QWP 68 may be layered onto (under) lateral surface 48 of waveguide 32. Reflective polarizer 70 may be layered onto (under) QWP 68 (e.g., QWP 68 may be interposed or sandwiched between reflective polarizer 70 and waveguide 32). In the example of FIG. 10, reflective polarizer 70 and QWP 68 cover or overlap all of surface 74 of prism 72. This is merely illustrative and, if desired, reflective polarizer 70 and/or QWP 68 may cover only a portion of surface 74 (e.g., a region such as region 62 shown in FIGS. 5-7).

As shown in FIG. 10, image light 30 may pass through waveguide 32 and towards prism 72. The image light 30 may first pass through QWP 68, which does not affect the unpolarized image light. The image light 30 may then pass into prism 72 through reflective polarizer 70, which imparts the first linear polarization to the image light (e.g., the entire beam of the image light). The image light 30 may reflect off reflective surface 76 back towards reflective polarizer 70. Since reflective polarizer 70 transmits light of the first linear polarization, reflective polarizer 70 may transmit the reflected image light. QWP 68 may impart a first circular polarization to image light 30 (e.g., both the first and second portions of the image light). The first portion of the image light (e.g., ray 50) may reflect off lateral surface 46 of waveguide 32 (in a first TIR reflection) and may be incident upon portions of lateral surface 48 of waveguide 32 that are non-overlapping with respect to prism 72 (for a second TIR reflection).

On the other hand, the second portion of the image light (e.g., ray 52) may reflect off lateral surface 46 (in a first TIR reflection) and may be incident upon QWP 68 (e.g., a portion of lateral surface 48 overlapping prism 72). Reflection off lateral surface 46 may change the polarization of the second portion of the image light to a second circular polarization opposite the first circular polarization. QWP 68 may convert the second portion of the image light from the second circular polarization to the second linear polarization orthogonal to the first linear polarization. Since reflective polarizer 70 reflects light of the second linear polarization, reflective polarizer 70 reflects the second portion of the image light incident on lateral surface 48 (for a second TIR reflection) rather than being lost through prism 72.

Figure 11:
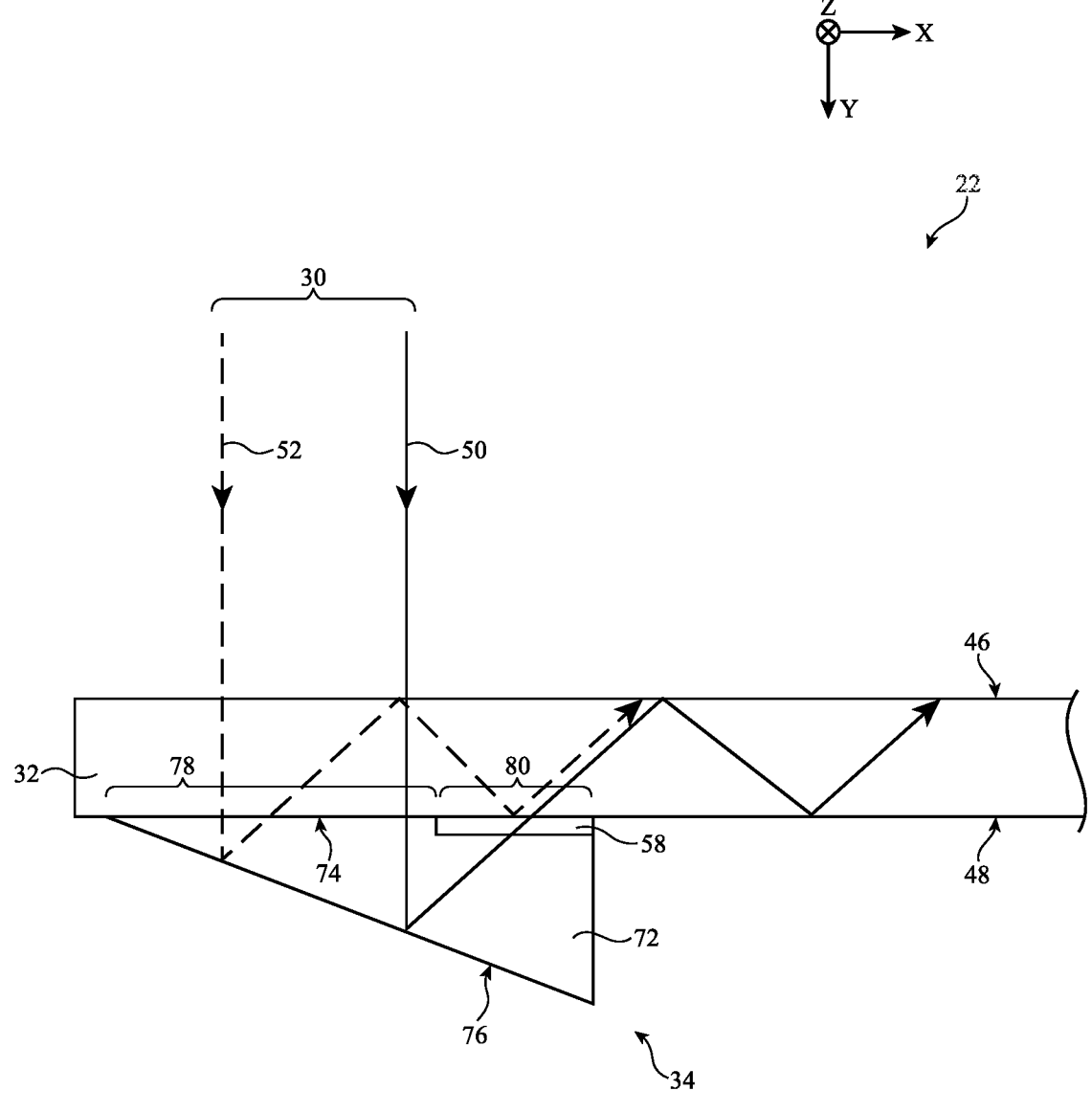
FIG. 11 is a top of an illustrative optical system having a reflective input coupling prism with a partial reflector that overlaps a portion of the reflective input coupling prism in accordance with some embodiments.

FIG. 11 is a diagram showing one example in which input coupler 34 includes partial reflector 58 overlapping only a portion of the reflective input coupling prism. As shown in FIG. 10, partial reflector 58 may be disposed on or overlapping a first region (area or portion) 80 of surface 74 of prism 72. A second region (area or portion) 78 of surface 74 of prism 72 may be uncovered (e.g., partial reflector 58 may overlap first region 80 but not second region 78). The size and placement of first region 80 may be selected so that partial reflector 58 overlaps only the region, area, or portion of surface 74 of prism 72 that receives the second portion of image light 30 (e.g., ray 52) after its first TIR reflection off lateral surface 46, for example. The portion, region, or area of surface 74 of prism 72 that does not receive the second portion of image light 30 after its first TIR reflection off lateral surface 46 may be non-overlapping with respect to partial reflector 58 (e.g., may form region 78).

Prism 72 may thereby couple the second portion of image light 30 incident upon prism 40 (e.g., between rays 52) into waveguide 32 through region 78 of surface 74. Partial reflector 58 may then reflect, back into waveguide 32, at least some (e.g., half) of the second portion of image light 30 incident upon the portion of lateral surface 48 overlapping prism 72 after the first TIR reflection of the second portion of image light 30 off lateral surface 46. This may help to keep the intensity of the pupil of image light 30 uniform across its pupil size, since the amount of loss due to reflection off partial reflector 58 will be approximately equal between the first portion of image light 30 (e.g., ray 50) and the second portion of image light 30 (e.g., ray 52). If desired, the arrangements of FIGS. 4, 6, 7, and/or 9 may be implemented using the reflective input coupling prism of FIGS. 10 and 11 instead of a transmissive input coupling prism (e.g., partial reflector 58 of FIG. 11 may have a tapered edge region, a transparent phase compensation layer may be disposed between region 78 of surface 74 and lateral surface 48 of waveguide 32, etc.). In any of the implementations described herein where image light propagates along waveguide 32 towards the output coupler with a circular polarization, an additional QWP may be disposed on or in waveguide 32 to operate on the image light with the circular polarization to convert the image light to a linear polarization if desired (e.g., for optimizing efficiency when the output coupler exhibits peak efficiency when operating on light of the linear polarization).

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent."

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people.

People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. An electronic device comprising:
a projector configured to generate light;
 a waveguide;
 a prism on the waveguide and configured to couple the light into the waveguide; and
 a partial reflector between the prism and the waveguide, wherein the prism has a surface facing the waveguide and has a reflective surface, the prism is configured to receive the light through the waveguide and the surface, and the reflective surface is configured to reflect the light into the waveguide through the surface.

2. The electronic device of claim 1, wherein the waveguide has a first lateral surface and a second lateral surface opposite the first lateral surface, the prism is mounted to the second lateral surface, the image light comprises a pupil, the partial reflector is configured to transmit, into the waveguide, a first portion and a second portion of the pupil, the first portion of the pupil is configured to be incident, after a first reflection off the reflective surface, upon a portion of the first lateral surface that is non-overlapping with respect to the prism, and the second portion of the pupil is configured to be incident, after a second reflection off the first lateral surface, upon the partial reflector.

3. The electronic device of claim 1, wherein the partial reflector overlaps some but not all of the surface.

4. The electronic device of claim 3, wherein the partial reflector overlaps a first portion of the surface, a second portion of the surface is non-overlapping with respect to the partial reflector, and the partial reflector is configured to reflect a portion of the light that is transmitted into the waveguide through the second portion of the surface after a reflection in the waveguide.

5. The electronic device of claim 4, further comprising:
a transparent phase compensation layer between the prism and the waveguide, wherein the transparent phase compensation layer overlaps the second portion of the surface.

6. The electronic device of claim 4, wherein the partial reflector has an edge region at the second portion of the surface, the edge region having a gradual reflectivity.

7. The electronic device of claim 6, wherein the partial reflector has a tapered thickness in the edge region.

8. The electronic device of claim 1, wherein the prism has a surface facing the waveguide that is configured to transmit the light into the waveguide and the partial reflector overlaps an entirety of the surface.

9. The electronic device of claim 1, wherein the partial reflector comprises a metal layer.

10. The electronic device of claim 1, wherein the partial reflector comprises a dielectric film.

11. The electronic device of claim 1, wherein the partial reflector comprises a set of diffractive gratings.

12. The electronic device of claim 1, wherein the waveguide has a first lateral surface and a second lateral surface opposite the first lateral surface, wherein a quarter waveplate is on the first lateral surface of the waveguide and configured to receive the light coupled into the waveguide through the prism, wherein the partial reflector comprises a reflective polarizer on the second lateral surface, the prism being configured to couple the light into the waveguide through the reflective polarizer.

13. An electronic device comprising:
a projector configured to generate light;
a waveguide;
a prism on the waveguide and configured to couple the light into the waveguide; and
a partial reflector between the prism and the waveguide, wherein the partial reflector comprises:
 a reflective polarizer; and
 a quarter waveplate on the reflective polarizer and interposed between the reflective polarizer and the waveguide.

14. The electronic device of claim 13, wherein the prism comprises a transmissive input coupling prism configured to couple the image light into the waveguide through the reflective polarizer and the quarter waveplate.

15. The electronic device of claim 13, wherein the prism comprises a reflective input coupling prism configured to receive the light through the quarter waveplate and the reflective polarizer and having a reflective surface configured to reflect the image light into the waveguide through the reflective polarizer and the quarter waveplate.

16. An electronic device comprising:
a waveguide;
a prism on the waveguide and configured to receive a pupil of image light; and
a partial mirror between the prism and the waveguide, wherein the partial mirror has an edge region and has a tapered thickness in the edge region, and wherein the prism is configured to direct a first portion of the pupil and a second portion of the pupil into the waveguide and wherein the partial mirror is configured to receive, from within the waveguide, the second portion but not the first portion of the pupil.

17. The electronic device of claim 16, wherein the partial mirror is configured to transmit the first portion but not the second portion of the pupil into the waveguide from the prism.

18. The electronic device of claim 17, wherein the prism comprises a transmissive input coupling prism.

19. The electronic device of claim 17, wherein the prism comprises a reflective input coupling prism.

20. The electronic device of claim 16, wherein the edge region has a gradual reflectivity.

* * * * *